Patented May 16, 1939

2,158,481

UNITED STATES PATENT OFFICE 2,158,481

PROLAMINE BASE COMPOSITION

Donald W. Hansen and Paul R. Shildneck, Decatur, Ill., assignor, by mesne assignments, to Prolamine Products Incorporated, Dover, Del., a corporation of Delaware No Drawing. Application December 11, 1933, Serial No. 701,866. Renewed September 30, 1938

21 Claims. (Cl. 106—38)

The present invention relates to a composition of matter suitable for coatings, and for manufacture of films and filaments. It has particular reference to the manufactuer of thin, strong, transparent sheets or films suitable for wrapping food, packages and other articles.

The invention employs as a base material a particular type of protein known as the prolamines. The prolamines are known as the alcohol soluble proteins. When prepared by alcoholic extractions and by driving off the solvent, the residual prolamine is a hard horny mass. In general the prolamines are characterized by insolubility in water, in absolute alcohol and in other neutral solvents, but are soluble in relatively strong aqueous alcohols of, for example 70% to 80% alcohol. The common prolamines are obtained from seeds of the cereal grains, and are designated zein from corn, gliadin from wheat, and hordein from barley. This general source and classification of prolamines is not exclusive, for it is known that there are other so-called prolamines, such as an alcohol-soluble protein found in milk, which however has chemical characteristics somewhat different. In referring herein to prolamines it is to be understood that prolamines from cereals are specifically intended, and such other alcohol-soluble proteins as have similar behavior.

The prolamines usually occur in grains in the gluten, and are extractable therefrom by an aqueous alcohol solvent. For example corn gluten may be extracted with a solvent mixture of 75% ethyl alcohol and 25% water, to remove the prolamine "zein". The methods of preparing and purifying zein and other prolamines are well known and form no essential part of the present invention. However, the said known processes may be modified so that they are conducted in a manner to provide a suitable alcoholic solution of prolamine as a starting material for practice of the present invention.

One of the difficulties with prior art films, filaments and coatings of prolamine base, either with or without plasticizer, is a blushing, spotting or whitening when wet with water, or when exposed to high humidity, especially at elevated temperatures. The defect is more particularly to be observed, and is most undesirable, in films and coatings. Films which are plasticized to suitable flexibility may enter into commerce as wrappings for food, packages, etc., and for decorative and protective purposes. In these and in many other uses of such materials it is almost impossible that the material escape some contact with water or high humidity whereby it will be damaged in appearance. This blushing is more disadvantageous at the present time than in former times, because today the public is provided with suitable flexible and transparent film wrappers which do not blush on contact with water or high humidity.

The object of the present invention is to provide a prolamine base composition which is suitable for making films, filaments and coatings that are immune to blushing on contact with water or high humidity.

Another object of the present invention is the provision of films, filaments and coatings from a prolamine base composition containing water, by a process including a drying out step yielding directly the non-blushing product.

A further object of the invention is the incorporation into a prolamine base composition of an anti-blushing agent which is a salt of an organic amino alcohol.

A further object of the invention is the use as an anti-blushing agent of an aliphatic acid salt of an aliphatic amino alcohol.

Various other and ancillary objects and advantages of the invention will be apparent from the following description and explanation of the invention.

In copending applications of Donald W. Hansen (one of the present joint inventors) U. S. Serial No. 701,863, filed December 11, 1933, now Patent No. 2,115,716, issued May 3, 1938, and U. S. Serial No. 701,864, filed December 11, 1933, now Patent No. 2,102,623, issued December 21, 1937, there are described prolamine base compositions having certain plasticizers with or without anti-blushing agents, and prolamine base compositions having anti-blushing agents with or without plasticizers. Said applications describe zein, hordein and gliadin as common suitable prolamines, obtained respectively from the corn gluten, barley gluten, and wheat gluten.

Numerous materials may be used as plasticizers in prolamine films. Some of these are described in the United States patent to Ostenberg, No. 1,316,854. In the above mentioned Hansen applications a wide variety of new plasticizers is named which are particularly effective to provide permanently plasticized products, that is, ones in which the plasticizer is homogeneously distributed and is not subject to alteration as by oxidation, or subject to removal, as by water, volatilization, crystallization and the like.

The present invention aims particularly to provide an anti-blushing agent for compositions plasticized as described in said Hansen applications, for the reason that the permanence of the plasticized product is coupled with the resistance to change by water and humidity, giving a relatively permanent commercially useful product, preferably in the form of a film or wrapper.

The said Hansen applications also name as the invention of Hansen a number of anti-blushing agents which may be used like the agent of this invention. Hansen describes and claims as anti-blushing agents:

(A) Amino acid esters or their salts.
    (B) Amino guanidine or its salts.
    (C) Semi-carbazide or its salts.

According to the present invention the anti-blushing agent is limited to the salts, when the base is an organic amino alcohol. This characteristic of our anti-blushing agent is distinctive over the classes A, B, and C above named, in that only the salt, and not the base, is active to impart an anti-blushing property.

We divide the class into groups of compounds. When the organic amine is aliphatic this constitutes one group. When the salt radical is of an aliphatic acid, this constitutes another group. The preferred species are those in which the amine is aliphatic, and the salt radical is of an aliphatic acid. We have discovered that suitable species of the present invention are monoethanolamine lactate, monoethanolamine acetate, monopropanolamine lactate and isobutanolamine acetate.

One way to make a prolamine base film embodying the present invention is first to provide a relatively free prolamine, such as zein. Prolamines are readily soluble in aqueous alcohols of 70% to 80% alcohol. It is commonly known that grain glutens may be extracted with such alcohols to provide an alcoholic solution of prolamine. The extract may be decolorized by treatment with suitable carbon or like agents, and the extract may be concentrated and modified to form about a 12% prolamine solution in a solvent of 70% ethyl alcohol and 30% water. Although the extracting liquid need not be the lower aliphatic alcohols, it is a common practice to use them, particularly ethyl alcohol.

Such a solution is not ordinarily suitable for addition of anti-blushing agent, with or without plasticizer, and with or without other modifying agents to form a composition suitable for making films, filaments and coatings. The rates of evaporation of lower alcohols, such as ethyl alcohol, and water, are not such as to assure retention of the solid ingredients in homogeneous distribution during the process of drying. To overcome this there may be added what is termed a leveling solvent, such as a higher boiling solvent substance, which is miscible with water and which is compatible with other ingredients present. Suitable material may be selected from the following list, as taught in said Hansen applications:

Normal propyl alcohol.
    Isopropyl alcohol.
    Normal butyl alcohol.
    Isobutyl alcohol.
    Secondary butyl alcohol.
    Tertiary butyl alcohol.
    Normal butyl carbinol.
    Isobutyl carbinol.
    Secondary butyl carbinol.
    Diethyl carbinol.
    Dimethyl-ethyl-carbinol.
    Methyl-propyl-carbinol.
    Methyl isopropyl carbinol.
    Ethylene glycol monomethyl ether.
    Ethylene glycol monoethyl ether.
    Ethylene glycol monobutyl ether.
    Trimethylene glycol monoethyl ether.
    Propylene glycol monoethyl ether.
    Ethylene glycol monobenzyl ether.
    b-b'-Dihydroxy ethyl ether.
    b-Ethoxy b'-ethoxy ethyl ether.
    Normal butyl alpha-hydroxy isobutyrate.
    Ethylene glycol mono acetate.
    b-Hydroxy ethyl formate.
    Ethyl alpha-hydroxy isobutyrate.
    Diacetone alcohol.
    Dimethyl-normal-propyl carbinol.
    Heptyl alcohol.
    Ethyl lactate.
    Diacetin.

Some of the items in the above list may in some instances effect in a resultant film a pebbly or "orange peel effect", while others may produce a smooth film. This action is not wholly a function of the leveling solvent, but is somewhat dependent upon other ingredients and factors too complicated, it appears, to be readily ascertained and particularly set forth.

It is also to be understood that in one instance an item in the above list may be suitable, when in another instance it may be unsuitable. The proportions and nature of ingredients, and the conditions of processing are so variable, that one may be obliged to select the leveling solvent judicially after making preliminary tests as to its suitability for a given mixture and procedure. This is readily accomplished by anyone skilled in the art.

Protein fixing

In general, the protein substances, like gelatin, are treated with some fixing agent or hardening agent, such as formaldehyde, alum, chromic acid, etc. While these are sometimes termed "hardening" agents, the real function is "fixing" the protein. We prefer not to call them hardening agents in this invention, because to some extent the plasticizers are sometimes considered as "softening" agents, and we do not wish it to be understood that the protein fixer and the plasticizer are antagonistic in function. The prolamines resemble other proteins in that they are similarly susceptible to the action of fixing agents. We prefer to use formaldehyde as a fixing agent, but others may be used. Glyoxal is also suitable for zein. It is not necessary to use a fixing agent to secure a film by the processes and with the agents herein described, but if a fixing agent such as formaldehyde is not used, the resulting film will soften in water. Use of a fixing agent is therefore not essential merely to form a film, but it is practically essential in making commercial films which may be subjected to the action of water.

Plasticizing

In plasticizing a prolamine composition for this invention, it is not essential that any particular type of plasticizer be used. We recommend, however, that those described by Hansen be used, and such may be selected from the following list:

Dibutyl tartrate.
    Di-isoamyl tartrate.
    Tri-butyl citrate.
    Dibenzyl tartrate.

Butyl salicylate.
Monoricinolein.
Monolinolein.
Monomyristin.
Monolaurin.
Ethylene glycol monolaurate.
Ethylene glycol monomyristate.
Toluenesulphonamide.
Toluenesulphonylmethylamide.
Toluenesulphonyldimethylamide.
Toluenesulphonylethylamide.
Toluenesulphonyldi-normal-butylamide.
Toluenesulphonanilide.
Toluenesulphonylmethylanilide.
Benzenesulphonamide.
Benzylsulphonamide.
Benzylsulphonanilide.
Benzylsulphonyl-normal-heptylamide.
Ethanesulphonamide.
Ethanesulphonyl-normal-butylamide.
Phthalate of ethylene glycol monoethyl ether.
Lactate of ethylene glycol monoethyl ether.
Glycine ethyl ester.
Alanine ethyl ester.
Ethyl carbamate.
Ethyl N-phenyl carbamate.
Diethyl-diphenyl-urea (symmetrical).
Alpha glyceryl phenyl ether.
Alpha glyceryl cresyl ether.
Alpha glyceryl methyl ether.
Alpha glyceryl benzyl ether.

*Example I*

To 75 parts by weight of a 12% prolamine solution, (either of zein, hordein, or gliadin, or any mixture of them) in a solvent of 70% alcohol and 30% water, is added: about 10 parts by weight of leveling solvent; about 2.5 parts by weight of commercial 37% formaldehyde solution as a fixing agent; if a plasticizer is desired then about 2 parts by weight of those herein recommended and listed; and as the anti-blushing agent about 2% to 3% (based on prolamine) which is about 0.18 to 0.27 part by weight of organic amino alcohol salt, such as those above specified.

This composition is suitable for forming a film. To assure film formation the mass may be spread on mercury to the desired thickness and allowed to dry by evaporation to form a film, for example at a temperature of 150° F. It is not necessary to cast the film on mercury. Smooth metal or glass or stone may be used, but we have found instances where certain compositions as films will not readily strip from one surface although the same composition as film will readily strip from a different surface. For assurance, therefore, we recommend mercury. Reference is also made to the copending Hansen application Serial No. 701,865, filed December 11, 1933, now Patent No. 2,070,596, issued February 16, 1937, which describes forming a strippable film, for example of cellulose acetate or nitrate, on a suitable surface, and then casting the prolamine film on the strippable film. Such procedure may be used in carrying out the present invention. Where the composition above described is to be used for coatings, or for making filaments, it may be manipulated in the manner customary for such purposes, as is well known in the art.

*Additional substances*

The present disclosure does not indicate that other substances may not be added to the solvent compositions of prolamines. As in other arts, certain modifying agents may be added. The question of possible addition is largely one of compatibility, not only in the presence of the solvent, but during evaporation of the solvent through the final drying. Insoluble materials such as pigments and filler may be added as desired.

Dyestuffs may be used in the mass. Butyl stearate up to about 5% on the basis of prolamine, may be added to give moisture transmission resistance. This may be present in the nitrocellulose stripping film for the same purpose. We have also found that alcohol soluble nitrocellulose and phenol-formaldehyde condensation resins are compatible in small amount in a zein film.

*The product*

The product may be a smooth transparent film when suitably compounded for this purpose. It may be non-transparent according to what may be additionally incorporated into it. It may lack smoothness when specifically so prepared as to present the orange-peel effect. In general, however, the aim is to secure a flexible tough clear transparent film, which is permanently pliable, and resistant to water and humidity, both as to absorption of them, and as to alteration of the appearance of the film by them.

In the manufacture of threads or filaments the more rigid requirements for the best films may be dispensed with, since the transparency and continuous surface characteristics become less important.

Since the fixing agent prevents swelling of the prolamine composition when it is wet with water, and since the anti-blushing agent prevents spotting of the composition, it is practically essential for a commercial water-resistant film for both to be used together. According to some theories of the mechanism of the organic anti-blushing agents, to which group the agents of this invention belong, to which theories we do not wish to bind ourselves, we believe that the fixing agent and our anti-blushing agent may work conjointly to effect the ultimate high degree of resistance to water and to high humidity.

It is to be understood that the invention is not limited to use in each instance of a single compound as an anti-blushing agent, and that it contemplates that a mixture of several species may be used effectively, whether the species all belong to the general class herein set forth, or whether some of the species in a compatible mixture are selected from other known anti-blushing agents, as for example those of the Hansen application above referred to.

Numerous changes and modifications of the invention may be made as a result of the disclosure herein given. It is not necessary that the plasticizer be a single material. Numerous species of each plasticizer have been named. Mixtures of plasticizers may be used insofar as the mixed ones are compatible with each other, and insofar as the mixture is compatible with the other ingredients for the film, or compatible in process. Such changes and modifications are contemplated as falling within the invention as defined in the appended claims.

We claim:

1. A composition of matter useful in the form of films, filaments and coatings comprising a prolamine base, a protein fixing agent for said base, and a salt of an aliphatic amino alcohol as an agent to render the composition stable against blushing or spotting with high humidity and moisture when the composition is in dry solid form.

2. A composition of matter useful in the form of films, filaments and coatings comprising a prolamine base, a protein fixing agent for said base, a plasticizer, and a salt of an aliphatic amino alcohol as an agent to render the composition stable against blushing or spotting with high humidity and moisture when the composition is in dry solid form.

3. A composition of matter useful in the form of films, filaments and coatings comprising a prolamine base, a protein fixing agent for said base, and an aliphatic acid salt of an aliphatic amino alcohol as an agent to render the composition stable against blushing or spotting with high humidity and moisture when the composition is in dry solid form.

4. A composition of matter useful in the form of films, filaments and coatings comprising a prolamine base, a protein fixing agent for said base, a plasticizer, and an aliphatic acid salt of an aliphatic amino alcohol as an agent to render the composition stable against blushing or spotting with high humidity and moisture when the composition is in dry solid form.

5. A composition of matter useful in the form of films, filaments and coatings comprising a prolamine base, a protein fixing agent for said base, and a lactate of an aliphatic amino alcohol as an agent to render the composition stable against blushing or spotting with high humidity and moisture when the composition is in dry solid form.

6. A composition of matter useful in the form of films, filaments and coatings comprising a prolamine base, a protein fixing agent for said base, and an acetate of an aliphatic amino alcohol as an agent to render the composition stable against blushing or spotting with high humidity and moisture when the composition is in dry solid form.

7. A composition of matter suitable for making films, filaments and coatings comprising in solution a prolamine as a base, a protein fixing agent, a salt of an aliphatic amino alcohol as an antiblushing agent, and an aqueous solvent mixture in which said materials are dissolved, said mixture being capable of evaporation to form a film, filament or coating, such product being characterized by inability to blush or spot upon exposure to high humidity or moisture when the composition is in dry solid form.

8. A composition of matter useful in the form of films, filaments and coatings as defined by claim 7 in which there is at least 2% on the basis of prolamine of a salt of an aliphatic amino alcohol as an agent to render the composition stable against blushing or spotting with high humidity and moisture when the composition is in dry solid form.

9. A composition of matter in the form of a solution as defined in claim 7 in which there is at least 2% based on prolamine of a salt of an aliphatic amino alcohol as an agent to render the composition stable against blushing or spotting with high humidity and moisture when the composition is in dry solid form.

10. A composition comprising a prolamine, a plasticizing sulphonamide, and salt of an organic amino alcohol incorporated together.

11. A composition comprising prolamine, an aromatic alkylated sulphonamide, and salt of an organic amino alcohol incorporated together.

12. A liquid coating composition comprising prolamine, a plasticizing sulphonamide, and salt of an organic amino alcohol incorporated together with a neutral organic mutual solvent having a relatively high boiling point as compared with the low molecular weight alcohols.

13. A liquid coating composition comprising prolamine, a substantially non-volatile neutral organic plasticizer, and salt of an organic amino alcohol incorporated together with a neutral organic mutual solvent having a boiling point higher than 120° C.

14. A liquid coating composition comprising incorporated together, prolamine, a plasticizing sulphonamide, salt of an organic amino alcohol, and a mutual solvent.

15. Method of preparing plastic compositions which comprises incorporating prolamine with a plasticizing sulphonamide, and salt of an organic amino alcohol in the presence of a neutral organic mutual solvent having a boiling point higher than 120° C.

16. Method of preparing plastic compositions which comprises incorporating prolamine with a plasticizing sulphonamide, and salt of an organic amino alcohol in the presence of a mutual solvent comprising aqueous ethylene glycol ether.

17. Method of preparing plastic compositions which comprises incorporating prolamine with a plasticizing sulphonamide, and salt of an organic amino alcohol in the presence of a mutual solvent comprising aqueous diacetone alcohol.

18. Method of preparing plastic compositions which comprises incorporating prolamine with a substantially non-volatile, neutral, odorless organic plasticizer, and salt of an organic amino alcohol in the presence of a neutral substantially colorless organic mutual solvent having a boiling point higher than 120° C.

19. Method of preparing plastic compositions which comprises incorporating prolamine with a substantially non-volatile neutral organic plasticizer, and salt of an organic amino alcohol in the presence of a mutual solvent comprising aqueous ethylene glycol ether.

20. Method of preparing plastic compositions which comprises incorporating prolamine with a substantially non-volatile neutral odorless organic plasticizer, and salt of an organic amino alcohol in the presence of a mutual solvent comprising aqueous diacetone alcohol.

21. A plastic composition comprising incorporated together prolamine, plasticizing sulphonamide, salt of an organic amino alcohol, and a mutual solvent having a boiling point higher than 120° C.

DONALD W. HANSEN.
PAUL R. SHILDNECK.